(12) United States Patent
Qaddoura et al.

(10) Patent No.: US 6,219,547 B1
(45) Date of Patent: Apr. 17, 2001

(54) SYSTEM AND METHOD FOR ROUTING IN A CELLULAR DIGITAL PACKET DATA NETWORK

(75) Inventors: Emad A. Qaddoura, Plano; Haseeb Akhtar, Garland, both of TX (US)

(73) Assignee: Nortel Networks Corporation (CA)

( * ) Notice: Subject to any disclaimer, the term of this patent is extended or adjusted under 35 U.S.C. 154(b) by 0 days.

(21) Appl. No.: 08/741,460

(22) Filed: Oct. 31, 1996

(51) Int. Cl.[7] .............................. H04Q 7/22; H04L 12/56
(52) U.S. Cl. .......................................... 455/432; 455/445
(58) Field of Search ................................... 455/432, 433, 455/445; 370/238

(56) References Cited

U.S. PATENT DOCUMENTS

| 5,325,362 | * | 6/1994 | Aziz | 455/432 |
| 5,400,338 | * | 3/1995 | Flammer, III | 455/432 |
| 5,533,029 | * | 7/1996 | Gardner | 370/329 |

FOREIGN PATENT DOCUMENTS

| 399612 | 11/1990 | (EP) . |
| 16330 | 6/1995 | (WO) . |
| WO 95/16330 | 6/1995 | (WO) . |

OTHER PUBLICATIONS

Myles A., et al., "A Mobile Host Protocol Supporting Route Optimization and Authentication," IEEE Journal on Selected Areas in Communications, vol. 13, No. 5, Jun. 1, 1995, pp. 839–849.

Parsa K: "The Mobitex* Packet–Switched Radio Data System," IEEE International Symposium on Personal, Indoor and Mobile Radio Communications, Oct. 19, 1992, pp. 534–538.

Haemaelaeinen J, et al., "Proposed Operation of GSM Packet Radio Networks," IEEE International Symposium on Personal, Indoor and Mobile Radio Communications, vol. 1, Sep. 27, 1995, pp. 372–377.

Myles A. et al., "A Mobile Host Protocol Supporting Route Optimization and Authentication," IEEE Journal on Selected Areas in Communications, vol. 13, No. 5, Jun. 1, 1995, pp. 839–849.

* cited by examiner

*Primary Examiner*—Andrew M. Dolinar
(74) *Attorney, Agent, or Firm*—Hunton and Williams

(57) ABSTRACT

Routing of data in a mobile radiotelephone system to an intended recipient roaming mobile end station (M-ES) is facilitated by determining if the M-ES is within the same geographic area of the originating data source. If the M-ES is within the same geographic area as verified by interrogation of the local mobile data interface station, then data is sent directly to the intended M-ES without transmission to the mobile end station's home mobile data interface station. If the intended recipient M-ES is not currently located within the same geographic area served by the originating data source, then the data is transmitted to the M-ES's home mobile data intermediate station where the last known location of the roaming M-ES is stored and then on to the appropriate mobile data intermediate station for transmission to the intended M-ES.

8 Claims, 3 Drawing Sheets

SYSTEM AND METHOD FOR ROUTING IN A CELLULAR DIGITAL PACKET DATA NETWORK

BACKGROUND OF THE INVENTION

1. Field of the Invention

The present invention relates generally to apparatus and method for communications and more specifically to mobile radio data communications systems.

2. Description of the Related Art

Circuit switching is inefficient for bursty mobile data services such as facsimile (fax), electronic mail (email), and short messaging. First generation cellular systems that provide data communications using circuit switching have difficulty passing modem signals through the audio filters of receivers designed for analog air-interfaces. Inevitably, voice filtering must be deactivated when data is transmitted over first generation cellular networks, and a dedicated data link must be established over the common air-interface. The demand for packet data services has, until recently, been significantly less than the demand for voice services, and first generation subscriber equipment design has focused almost solely on voice-only cellular communications. The cellular digital packet data (CDPD) standard was developed to coexist with the conventional voice-only cellular system.

However, numerous shortcomings exist with CDPD systems. One such shortcoming occurs when a mobile end-station (M-ES) is roaming away from the area covered by its home mobile data intermediate station (MD-IS). Much time, overhead processing and routing resources are expended in forwarding the data to the MD-IS serving the area in which the M-ES is now visiting.

There is accordingly a need for improvements in the system and method for routing digital packet data to a roaming M-ES in a Cellular Digital Packet Data network in order to solve or ameliorate the above-described problem.

SUMMARY OF THE INVENTION

Cellular Digital Packet Data (CDPD) is a data service for first and second generation U.S. cellular systems and uses a full 30 kHz AMPS channel on a shared basis. CDPD provides mobile packet data connectivity to existing data networks and other cellular systems without any additional bandwidth requirements. CDPD may directly overlay with existing cellular infrastructure and use existing base station equipment, making it simple and inexpensive to install, or it may be incorporated within new systems. Furthermore, CDPD does not have to use the Mobile Switching Center (MSC), but rather may have its own traffic routing capabilities. CDPD occupies voice channels purely on a secondary, noninterfering basis, and packet channels are dynamically assigned (hopped) to different cellular voice channels as they become vacant, so the CDPD radio channel varies with time.

According to a specific implementation of our invention, routing of data to an intended recipient roaming mobile end station (M-ES) within a CDPD network is facilitated by determining if the roaming station is within the same geographic area of the originating data source. If the intended recipient roaming mobile end station is within the same geographic area as verified by interrogation of the local mobile data interface station, then data is sent directly to the intended mobile end station without transmission to the intended mobile end station's home mobile data interface station.

If the intended recipient mobile end station is not currently located within the same geographic area served by the originating data source, then the data is transmitted to the mobile end station's home Mobile data intermediate station where the last known location of the roaming mobile end station is stored and then on to the appropriate mobile data intermediate station corresponding to the last known location.

Advantages of the current invention include reduced processing time, less network overhead in transferring data messages throughout the network and a reduction in congestion due to no longer needing to encapsulate and decapsulate data into and from data packets for transmission.

The foregoing features together with certain other features described hereinafter enable the overall system to have properties differing not just by a matter of degree from any related art, but offering an order of magnitude more efficient use of processing time and resources.

Additional features and advantages of the invention will be set forth in part in the description which follows, and in part will be apparent from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate preferred embodiments of the apparatus and method according to the invention and, together with the description, serve to explain the principles of the invention.

DETAILED DESCRIPTION

Cellular Digital Packet Data (CDPD) is a data service for first and second generation U.S. cellular systems and uses a full 30 kHz AMPS channel on a shared basis. CDPD may also be utilized with digital systems such as IS-54 or GSM TDMA as well as Code Division Multiple Access (CDMA) systems such as IS-95. CDPD provides mobile packet data connectivity to existing data networks and other cellular systems without any additional bandwidth requirements. It also capitalizes on the unused air time which occur between successive radio channel assignments by the Mobile Switching Center (MSC) (it is estimated that for 30% of the time, a particular cellular radio channel is unused, so packet data may be transmitted until that channel is selected by the MSC to provide a voice circuit).

CDPD may directly overlay with existing cellular infrastructure and use existing base station equipment, making it simple and inexpensive to install, or it may be incorporated within new systems. Furthermore, CDPD does not have to use the MSC, but rather may have its own traffic routing capabilities. CDPD occupies voice channels purely on a secondary, noninterfering basis, and packet channels are dynamically assigned (hopped) to different cellular voice channels as they become vacant, so the CDPD radio channel varies with time.

A mobile end system (M-ES) is a mobile station that originates and/or receives data such as fax, e-mail or short messaging. It has an associated home Mobile Data Intermediate System (MD-IS). Data intended for the recipient M-ES heretofor has always been routed to the home MD-IS.

Figure 1:
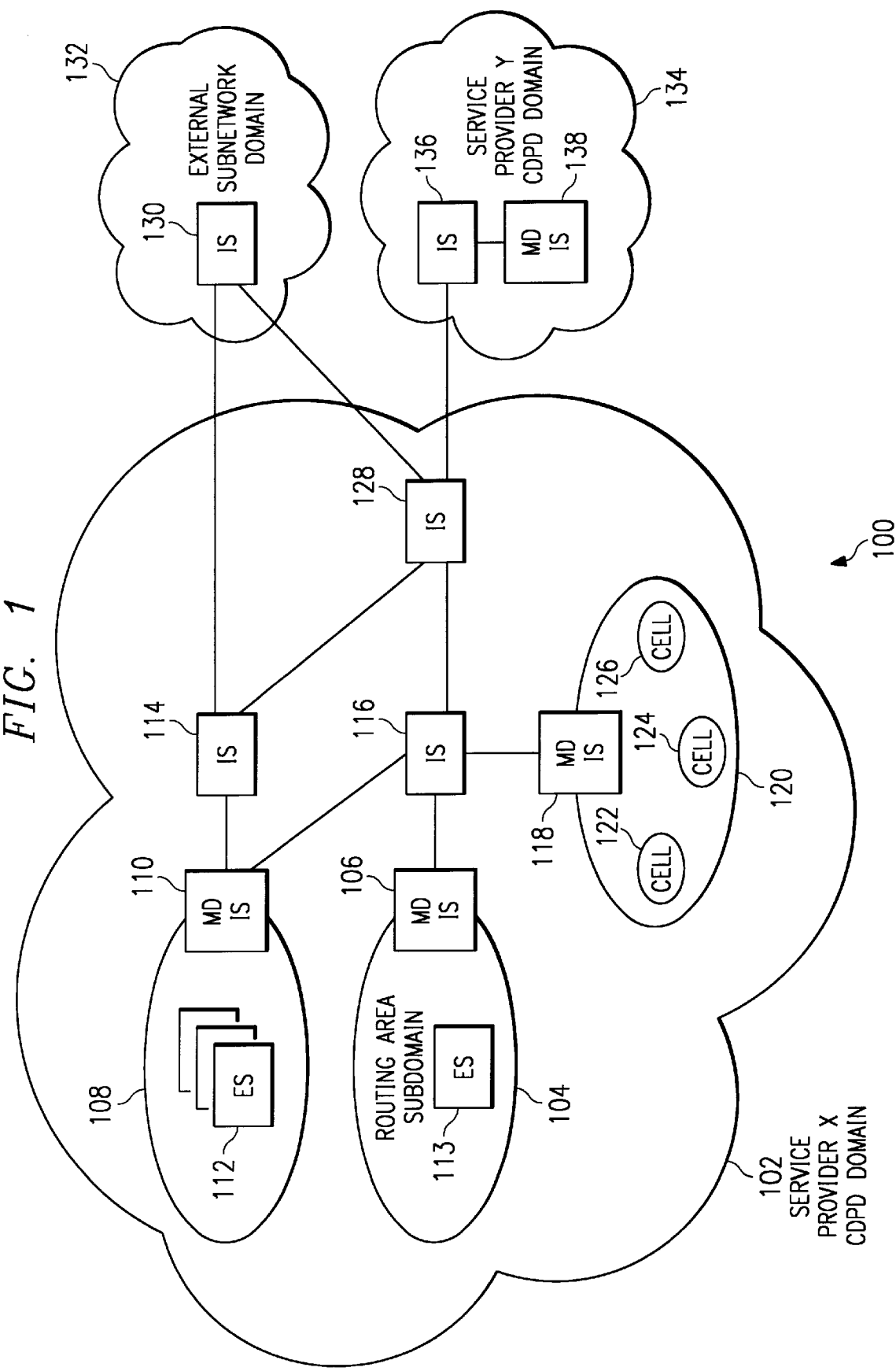
FIG. 1 illustrates a typical cellular network of the present invention.

Referring now to FIG. 1, a cellular digital packet data network (CDPD) 100 is presented. One of the unique attributes of CDPD network 100 is that M-ESs 112 change their subnetwork point of attachment with an MD-IS 106, 110,118,138 at will therefore making traditional forms of network connectivity and routing ineffective. The route to a recipient M-ES 112,113 may often not be determined by examination from a network address due to its roaming capability.

The geographic area over which CDPD Network service is available is subdivided into cells 122–126, areas 104,108, 120 and domains 102,132,134.

A cell 122–126 (not all cells are shown) is defined by the geographic area covered by a single Mobile Data Base Station (MDBS) (not shown), or in the case of sectorized cells, the sector. In any given cell 122–126 or sector, there may be zero, one or more than one physical channels available for CDPD service.

An MDBS is under the control of a single Mobile Data Intermediate Station (MD-IS) 106,110,118,138. The combined geographic coverage of all MDBSs under the control of a single MD-IS defines a routing area sub-domain 104.

A CDPD domain 102,132,134 is defined by the set of MD-ISs operated and administered by a single CDPD Provider. Mobility between those separate Service Providers is governed by contractual agreements but technically is no different between areas served by a single Service Provider.

Each M-ES 112,113 is aware of the cell 122–126 in which it is located based on the channel stream it is currently using. When M-ES 112,113 moves to another cell, it notifies the network 100 by indicating a change to the channel stream used in the new cell. M-ES 112,113 registers its Network Entity Identifiers (NEI) with the CDPD Network through the Mobile Network Registration Protocol (MNRP). When registered with the CDPD Network, M-ES 112,113 is a transitory member of a current serving area subdomain; that is, it has a serving MD-IS.

Each M-ES 112,113 is identified by one or more unique Network Entity Identifiers (NEIs), which are used to route messages to the M-ES. Each NEI has a single home subdomain; that is, the NEI home MD-IS. The NEIs for a given M-ES may refer to different home subdomains. When operating in its home area, the serving and home subdomains for an M-ES are the same; they are different when the MES is outside its home area.

Mobile Data-Intermediate Stations (MD-ISs) 106,110, 118,134 perform routing functions based on additional knowledge of the current location of M-ESs. MD-ISs are the only network-relay systems that have any knowledge of mobility and operate a CDPD-specific Mobile Network Location Protocol (MNLP) to exchange location information.

Figure 2:
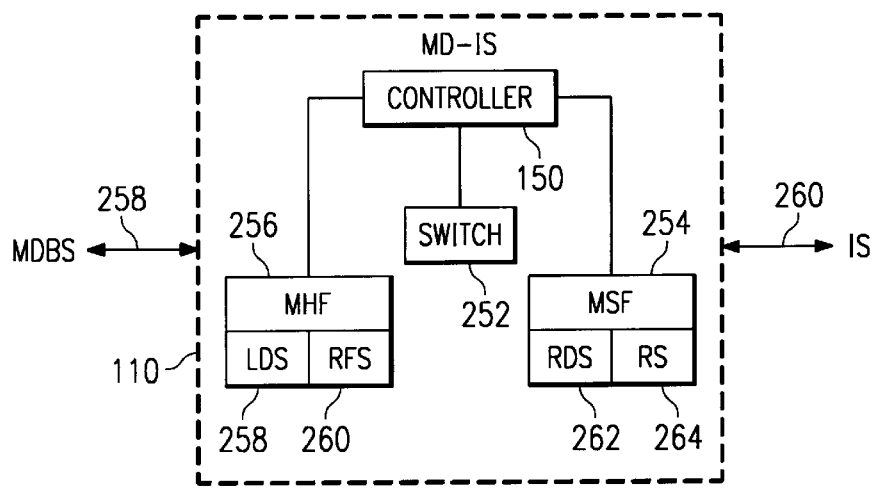
FIG. 2 illustrates a simplified block diagram of a Mobile Data Intermediate Station (MD-IS).

Referring now to FIG. 2, each MD-IS 110 performs two distinct mobility routing functions that cooperate to provide location-independent network service.

The first mobility routing function is the Mobile Home Function (MHF) 256. Every M-ES is logically a member of a fixed home area. The home area provides the anchor or mobility-independent routing destination area for fixed permanent Intermediate Stations (ISs) 114,116,128,130,136.

The Mobile Home Function (MHF) 256 consists of two services, a Location Directory Service (LDS) 258 and a Redirection and Forwarding Service (RFS) 260.

Location Directory Service (LDS) 258 maintains an information base of the current serving area for each of its home M-ESs while Redirection and Forwarding Service (RFS) 260 provides MHF 256 packet forwarding service in the forward direction only. The redirection and forwarding function is based on the principle of encapsulating M-ES addressed packets and forwarding them to MSF 254 in the serving area in which the M-ES is currently visiting.

In the forward direction (packets destined for an M-ES), packets are routed by traditional means first to the MD-IS (for example 110) in the home area 108, then encapsulated and tunnelled to the MD-IS (in this example 106) in the current serving area 104, then routed to M-ES 113 at its current cell location.

Packets originating from an M-ES are routed directly to their destination by traditional means. There is no requirement for packets in the reverse direction to transit the home MD-IS.

The Mobile Serving Function (MSF) 254 of an MD-IS 110 handles the routing of packets for all visiting M-ESs in its serving area. When an M-ES registers for network access in an MD-IS 110 serving area, MSF 254 notifies the home MD-IS of its current location.

The MSF consists of two services, Registration Directory Service (RDS) 262 and Readdress Service (RS) 264.

Registration Directory Service (RDS) 262 maintains an information base of the M-ESs currently registered in the serving area.

Readdress Service (RS) 264 decapsulates forwarded Network Protocol Data Units (NPDUs) from another MD-IS and routes them to the correct channel stream in a cell.

Also, the serving MD-IS management functions cooperate with the network support service applications for authentication, authorization and accounting of the use of the network services by the M-ES.

Figure 3:
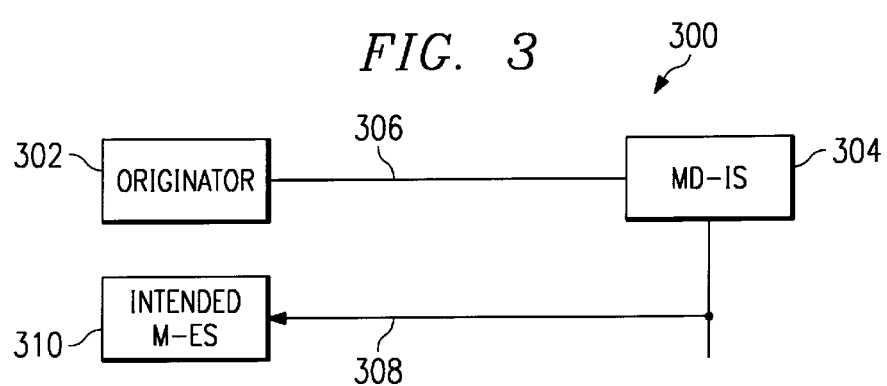
FIG. 3 illustrates a message flow diagram for data transfer when the originator and intended recipient are served by the same Mobile Data Intermediate Station (MD-IS).

The situation where the originator of data and the intended recipient are within same MD-IS will be discussed by referring to FIG. 3. When a data message is originated by an originator 302 it is sent via link 306 to the local MD-IS 304 responsible for that area. If the intended M-ES 310 happens to be roaming within the geographic area served by local MD-IS 304, then the roaming status location is recorded in RDS (see item 262 in FIG. 2) of MSF 254. The data message is then routed directly to intended M-ES 310 via link 308 without further routing through the network to the M-ES's home MD-IS.

Figure 4:
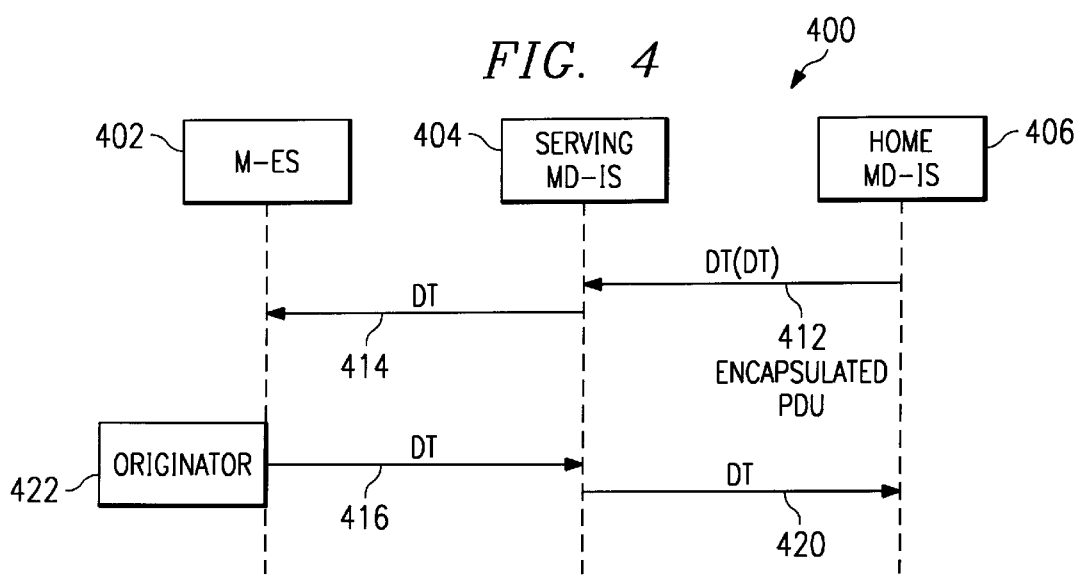
FIG. 4 illustrates a message flow diagram for data transfer when the originator and intended recipient are served by different Mobile Data Intermediate Stations (MDISs).

The situation where the originator and intended recipient are not located within the area served by the same MD-IS requiring Redirection and Forwarding will now be discussed with reference to FIG. 4.

When an M-ES 402 has visited out of its home area and has registered for service in its current area, NPDUs transmitted via link 416 intended for M-ES 402 may follow different routes through the network than NPDUs originated by the M-ES 402.

The Redirection Service provides a mechanism for forwarding NPDUs that are originated from outside the M-ES's current serving area. The Redirection Service at the home area MD-IS 406 participates in the standard Network Layer routing protocols, such that it advertises direct Network Layer reachability to NSAP addresses corresponding to its home area M-ESs. NPDUs addressed to an M-ES will, therefore, be routed and relayed by traditional means to the Redirection Service associated with the destination.

When the Redirection Service receives an NPDU addressed to one of its home area M-ESs, it queries the Location Directory (LDS 258 of FIG. 2) within MD-IS 406 to obtain a mapping between the home area Network Service Access Point (NSAP) address and the current Forwarding Address.

The Redirection Service encapsulates the original NPDU in a new NPDU addressed to the Forwarding Address. The encapsulated NPDU is then routed by traditional means 412 to the Readdress Service at the serving area MD-IS 404 where MES 402 is currently located.

When the Readdress Service at the serving area receives an NPDU addressed to its Forwarding Address, it decapsulates NPDU, restoring the original NPDU addressed to the destination M-ES. The original NPDU is then routed by traditional routing to the current cell of the M-ES.

If an originator happens to be an M-ES, the NPDU is routed by traditional means to its destination. There is no need to redirect NPDUs to the originator's home area. If the destination happens to be another M-ES, it will be routed to that M-ES's home area and handled as above.

Figure 5:
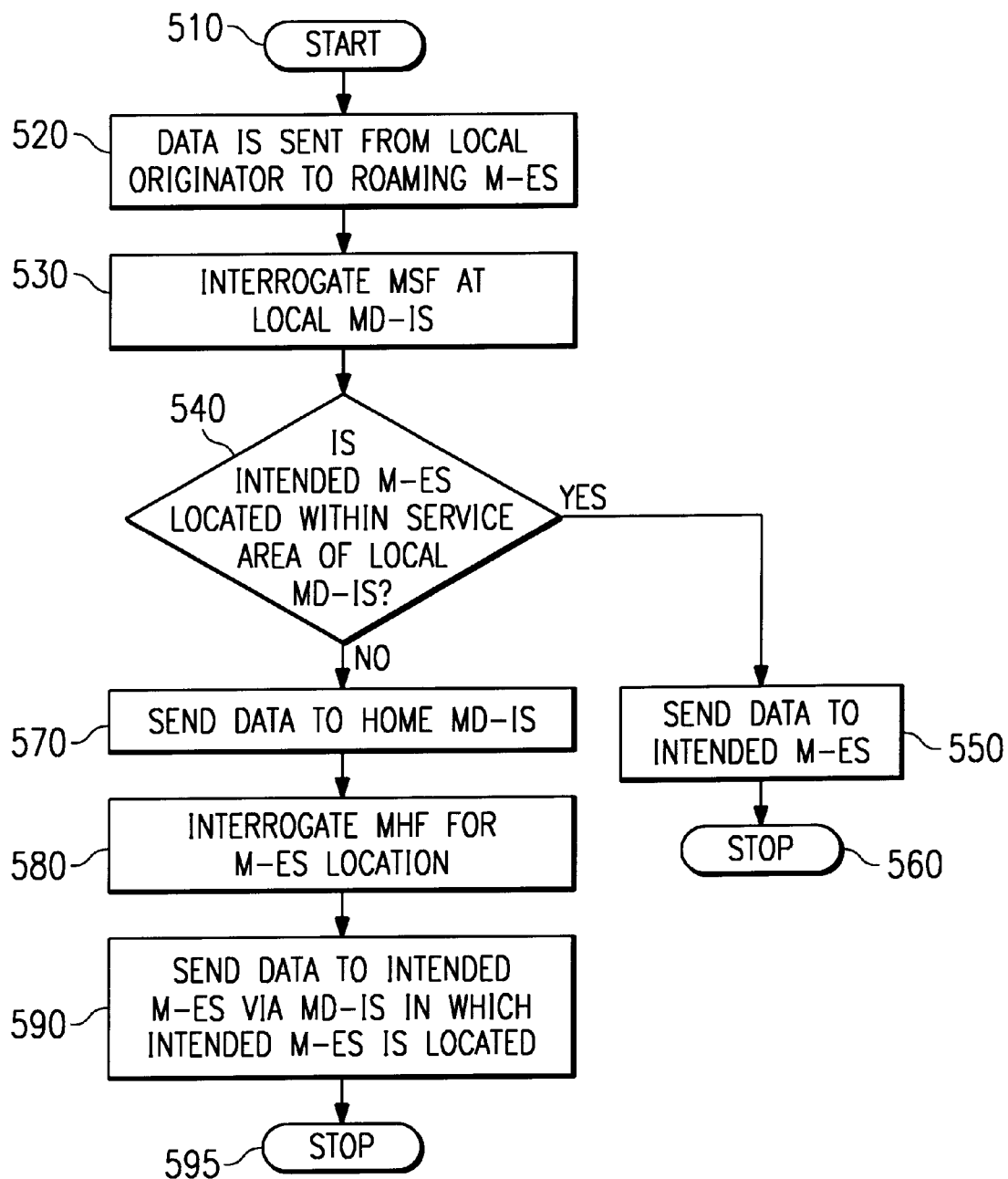
FIG. 5 illustrates a flow chart of the method of data transfer of the present invention.

FIG. 5 is a representation of the method of operation of the instant invention in flowchart form. Flow begins at Start 510. Data is sent from a data originator to the network intended for an M-ES capable of roaming among geographic areas served by at least one MD-IS in step 520. In step 530 the MSF at the serving MD-IS is interrogated to see if the intended M-ES is within the area served by that MD-IS. The addresses of the various M-ESs are compared in step 540. If a match occurs in step 540, then the intended M-ES is known to be located within the area served by the current MD-IS and control is transferred to step 550. Step 550 operates to send the data message to the intended M-ES and flow stops at step 560.

If the address of the intended M-ES is not found in step 540, then it is known that the intended M-ES is not located within the geographic area served by the MD-IS in which the data originated. In that event, control is transferred to step 570 where the data message is sent to the home MD-IS of the intended recipient M-ES. The Mobile Home function (MHF) of the home MD-IS is then interrogated to ascertain the current (or last known) whereabouts of the intended recipient M-ES. The data is then sent to the intended recipient M-ES through the MD-IS in which the intended recipient M-ES is currently located. That current location may be either its home location or its roaming location.

Data may be sent from an M-ES, a fixed station or the network, any of which may be an originator or source of data.

The above described invention is applicable to various transmission modes, including a simplex mode one way broadcast message to at least a single M-ES, a half-duplex mode broadcast message with message reception acknowledgement and to a full-duplex two way fully interactive communication.

Other such embodiments of the invention will be apparent to those skilled in the art from consideration of the specification and practice of the invention disclosed herein. It is readily apparent that the above described invention may be implemented in any type of radiotelephone system including a cellular or microcellular, public or private system that involves any method that uses differentiation of modulation types of a RF channel to identify a control channel. It is intended that the specification and examples be considered as exemplary only, with a true scope and spirit of the invention being indicated by the following claims.

What is claimed is:

1. In a mobile data intermediate station for use in a network including cellular digital packet data capability, the mobile data intermediate station capable of serving multiple roaming mobile end stations which also correspond to at least one home mobile intermediate station, a method of communicating with a roaming mobile end station comprising the steps of:

receiving a request from an originating mobile end station to send data to the roaming mobile end station;

determining, by reference to a mobile serving function (MSF), if the roaming mobile end station is in an area served by the mobile data intermediate station; and if the roaming mobile end station is in an area served by the mobile data intermediate station, sending the data, in the form of one or more network protocol data units, directly via said mobile data intermediate station from the originating mobile end station to the roaming mobile end station without further routing through said network, and without transmitting the data to a home mobile intermediate station which is associated with the roaming mobile end station and without encapsulation of the one or more network protocol data units.

2. The method of claim 1 wherein the determining step includes searching a local database to determine whether the roaming mobile end station is in an area served by the mobile data intermediate station.

3. The method of claim 1 further comprising the step of sending data to the home mobile data intermediate station if the roaming mobile end station is not in an area served by the mobile data intermediate station.

4. The method of claim 2 further comprising the step of sending data to the home mobile data intermediate station if the roaming mobile end station is not in an area served by the mobile data intermediate station.

5. Apparatus for use in a network including cellular digital packet data capability, the apparatus capable of serving multiple roaming mobile end stations which also correspond to at least one home mobile intermediate station, The apparatus comprising:

means for receiving a request from an originating mobile end station to send data to a roaming mobile end station in;

a mobile serving function for determining if the roaming mobile end station is in an area served by the apparatus; and means for sending the data, in the form of one or more network protocol data units, directly via said apparatus from the originating mobile end station to the roaming mobile end station without further routing through said network, and without transmitting The data to a home mobile intermediate station which is associated with the roaming mobile end station and without encapsulation of the one or more network protocol data units.

6. The apparatus of claim 5 further comprising a local database to determine whether the roaming mobile end station is in an area served by the apparatus.

7. The apparatus of claim 5 further comprising means for sending data to the home mobile data intermediate station if the roaming mobile end station is not in an area served by the apparatus.

8. The apparatus of claim 6 further comprising means for sending data to the home mobile data intermediate station if the roaming mobile end station is not in an area served by the apparatus.

* * * * *